United States Patent
Ohtani et al.

(10) Patent No.: US 10,487,187 B2
(45) Date of Patent: Nov. 26, 2019

(54) RUBBER LATEX ELASTIC FOAMED BODY

(71) Applicant: TAIKI CORP., LTD., Osaka-shi, Osaka (JP)

(72) Inventors: Naoyuki Ohtani, Osaka (JP); Daiki Mita, Osaka (JP); Muneto Nishimura, Osaka (JP)

(73) Assignee: TAIKI CORP., LTD., Osaka-shi (JP)

( * ) Notice: Subject to any disclaimer, the term of this patent is extended or adjusted under 35 U.S.C. 154(b) by 509 days.

(21) Appl. No.: 15/110,481

(22) PCT Filed: Jan. 7, 2015

(86) PCT No.: PCT/JP2015/050213
§ 371 (c)(1),
(2) Date: Jul. 8, 2016

(87) PCT Pub. No.: WO2015/105113
PCT Pub. Date: Jul. 16, 2015

(65) Prior Publication Data
US 2016/0333158 A1    Nov. 17, 2016

(30) Foreign Application Priority Data

Jan. 9, 2014 (JP) .................. 2014-002789

(51) Int. Cl.
*C08J 9/30* (2006.01)
*C08J 9/00* (2006.01)

(52) U.S. Cl.
CPC ............... *C08J 9/0042* (2013.01); *C08J 9/30* (2013.01); *C08J 2201/026* (2013.01); *C08J 2205/044* (2013.01); *C08J 2207/00* (2013.01); *C08J 2309/04* (2013.01)

(58) Field of Classification Search
CPC ...... C08J 9/0042; C08J 9/30; C08J 2201/026; C08J 2205/044; C08J 2309/04
See application file for complete search history.

(56) References Cited

U.S. PATENT DOCUMENTS 4,776,356 A * 10/1988 Jou .................. A45D 34/04
132/320

FOREIGN PATENT DOCUMENTS

| JP | 08-228826 A | | 9/1996 |
| JP | 9-84630 A | | 3/1997 |
| JP | H9-084630 | * | 3/1997 |
| JP | 2002-020520 A | | 1/2002 |
| JP | 2004-075897 A | | 3/2004 |

(Continued)

OTHER PUBLICATIONS

Office Action dated Feb. 8, 2018, issued in counterpart Japanese Application No. 2015-556812, with English translation. (7 pages).

*Primary Examiner* — Kara B Boyle
(74) *Attorney, Agent, or Firm* — Westerman, Hattori, Daniel & Adrian, LLP (57) ABSTRACT

A rubber latex elastic foam body produced using as the raw material therefor rubber latex and sodium silicofluoride, having an average radius for the cellular foam configuring the foam body of 10-200 μm, a bulk density of 0.10-0.20 g/cm$^3$, and stress at 50% compression of 0.1-1 N/cm$^2$. This rubber latex elastic foam body has a rich texture, good adhesiveness to a skin, excellent powder adhesion, and excellent even powder application.

10 Claims, 5 Drawing Sheets

(56) References Cited

FOREIGN PATENT DOCUMENTS

| JP | 2004-250640 | * | 7/2004 |
|----|-------------|---|--------|
| JP | 3544542 B1 | | 7/2004 |
| JP | 3945583 B2 | | 7/2007 |
| JP | 2013-202335 A | | 10/2013 |

* cited by examiner

RUBBER LATEX ELASTIC FOAMED BODY

TECHNICAL FIELD

The present invention relates to a rubber latex elastic foamed body. More particularly, the present invention relates to a rubber latex elastic foamed body which can be suitably used, for example, as a makeup application tool such as a puff used on applying a cosmetic to the skin.

BACKGROUND ART

In general, when an elastic foamed body is produced from a rubber latex, there has been employed a Dunlop method in which the air is blown into a liquid mixture obtained by adding a vulcanizing agent, an auxiliary and the like to a rubber latex to generate bubbles, an aqueous dispersion of sodium silicofluoride is added to the liquid mixture, fine bubbles are imparted to the liquid mixture by stirring the liquid mixture while adjusting the liquid mixture to be acidic, the liquid mixture is then solidified, and the solidified body thus obtained is heated. However, when an elastic foamed body is produced by the Dunlop method, it is difficult to obtain an elastic foamed body having a fine foam structure formed at the time of initiation of the solidification of the liquid mixture, since the fine bubbles are coupled with one another to form greater bubbles until the liquid mixture is solidified after the fine bubbles are imparted to the liquid mixture.

Hence, as an elastic foamed body having a fine bubble structure, there has been proposed a method for producing an elastic body having a cell structure, in which a liquid for preparing an elastic cell obtained by adding the air and sodium silicofluoride to a rubber latex solution is irradiated with a microwave to solidify the liquid for preparing an elastic cell, and then vulcanization is carried out (for example, see Patent Documents 1 and 2).

The elastic body having a cell structure obtained by the above-mentioned method has, for example, the number of cells of the cross section of 8 cells/mm$^2$ or more, a 50% compressive stress of 1.0 N/cm$^2$ or less and an apparent density of 0.150 g/cm$^3$ or less. Therefore, the elastic body is excellent in flexibility and feel to a skin.

It is true that the above-mentioned elastic body is excellent in flexibility and feel to a skin. However, in recent years, it has been desired to develop an elastic foamed body which has rich texture and which is excellent in fitting property to a skin, application property of a powder and even powder application.

PRIOR ART DOCUMENTS

Patent Document(s)

Patent Document 1: Japanese Patent No. 3544542
Patent Document 2: Japanese Patent No. 3945583

SUMMARY OF THE INVENTION

Problem to be Solved by the Invention

The present invention has been made in view of the above-mentioned prior art. An object of the present invention is to provide an elastic foamed body which has rich texture and which is excellent in fitting property to a skin, application property of a powder and even powder application.

Means for Solving Problem

The present invention relates to
(1) a rubber latex elastic foamed body, in which a rubber latex and sodium silicofluoride are used as raw materials, wherein the foamed body has an average radius of cellular foam of 10 to 200 μm, a bulk density of 0.10 to 0.20 g/cm$^3$ and a stress of 0.1 to 1 N/cm$^2$ at 50% compression, and
(2) the rubber latex elastic foamed body according to the above-mentioned item (1), wherein the rubber latex elastic foamed body has a coefficient of dynamic friction of 0.5 to 1.8.

Effect of the Invention

According to the present invention, there is provided an elastic foamed body which has rich texture and which is excellent in fitting property to a skin, application property of a powder and even powder application.

MODE(S) FOR CARRYING OUT THE INVENTION

The rubber latex elastic foamed body of the present invention has some characteristics in that a rubber latex and sodium silicofluoride are used as raw materials, and that the foamed body has an average radius of cellular foam of 10 to 200 μm, a bulk density of 0.10 to 0.20 g/cm$^3$ and a stress of 0.1 to 1 N/cm$^2$ at 50% compression. Since a rubber latex and sodium silicofluoride are used as raw materials of the rubber latex elastic foamed body of the present invention, and the rubber latex elastic foamed body has a specific average radius of cellular foam, a specific bulk density and a specific stress at 50% compression as mentioned above, the rubber latex elastic foamed body of the present invention has rich texture and is excellent in fitting property to a skin, application property of a powder and even powder application.

As raw materials of the rubber latex elastic foamed body of the present invention, a rubber latex and sodium silicofluoride are used.

The rubber latex includes, for example, a synthetic rubber latex and a natural rubber latex. These rubber latexes can be used alone or in combination.

The synthetic rubber latex is a rubber latex synthesized by an emulsion polymerization method. A rubber component which is used in the synthetic rubber latex includes, for example, isoprene rubber, nitrile rubber, chloroprene rubber, butyl rubber, acrylonitrile-butadiene rubber, styrene-butadiene rubber, butadiene rubber and the like, and the present invention is not limited only to those exemplified ones. These rubber components can be used alone, or two or more kinds thereof can be used in combination.

The natural rubber latex includes, for example, a raw latex, a purified latex, a high ammonia latex and the like, and the present invention is not limited only to those exemplified ones. These natural rubber latexes can be used alone, or two or more kinds thereof can be used in combination.

The content of the rubber component (solid) in the rubber latex is not particularly limited, and preferably 50 to 80% by mass, more preferably 60 to 75% by mass and furthermore preferably 65 to 70% by mass, from the viewpoint of suppression of occurrence of a so-called "void" and efficient production of a rubber latex elastic foamed body having a uniform composition.

It is preferred to add a vulcanizing agent to the rubber latex from the viewpoint of imparting of rich elasticity to a rubber latex elastic foamed body by crosslinking the rubber component.

The vulcanizing agent includes, for example, sulfur, a sulfur-containing compound and the like, and the present invention is not limited only to those exemplified ones. The above-mentioned vulcanizing agents can be used alone or in combination.

The amount of the vulcanizing agent per 100 parts by mass of the rubber component (solid) is preferably 0.1 part by mass or more and more preferably 0.3 part by mass or more, from the viewpoint of improvement in elasticity of the rubber latex elastic foamed body by crosslinking the rubber component, and is preferably 10 parts by mass or less, more preferably 5 parts by mass or less and furthermore preferably 3 parts by mass or less, from the viewpoint of improvement in texture of the rubber latex elastic foamed body and fitting property to a skin.

In addition, an additive such as a vulcanization accelerator, a vulcanization accelerating auxiliary, an age resister, a filler, a surfactant, an antioxidant, an antimicrobial agent, a thermal stabilizer, a thickener, a foaming agent, a plasticizer, an antifungal agent or a coloring agent can be added to the rubber latex within a scope which would not hinder an object of the present invention. These additives can be used alone, or two or more kinds thereof can be used in combination.

The vulcanization accelerator includes, for example, zinc N-ethyl-N-phenyldithiocarbamate, zinc dimethyldithiocarbamate, zinc diethyldithiocarbamate, zinc dibutyldithiocarbamate, zinc salt of 2-mercaptobenzothiazole, tetramethylthiuram disulfide and the like, and the present invention is not limited only to those exemplified ones. These vulcanization accelerators can be used alone, or two or more kinds thereof can be used in combination. The vulcanization accelerator is easily commercially available. Examples the vulcanization accelerator includes, for example, trade name: Accel MZ produced by Kawaguchi Chemical Industry Co., LTD. and the like, and the present invention is not limited only to the exemplified one.

The vulcanization accelerating auxiliary includes, for example, zinc oxide, stearic acid and the like, and the present invention is not limited only to those exemplified ones. These vulcanization accelerating auxiliaries can be used alone, or two or more kinds thereof can be used in combination.

The age resister includes, for example, a phenol-based age resister, an amine-based age resister and the like, and the present invention is not limited only to those exemplified ones. These age resisters can be used alone, or two or more kinds thereof can be used in combination.

The filler includes, for example, a calcium carbonate powder, a titanium oxide powder, kaolin, clay and the like, and the present invention is not limited only to those exemplified ones. These fillers can be used alone, or two or more kinds thereof can be used in combination.

The surfactant can be used for the purpose of uniformly dispersing other additives in the rubber latex, and the like. The surfactant includes, for example, a cationic surfactant, an anionic surfactant, an amphoteric surfactant, a nonionic surfactant and the like, and the present invention is not limited only to those exemplified ones.

The rubber latex elastic foamed body of the present invention can be produced, for example, by injecting the air into a liquid raw material containing a rubber latex and an additive as occasion demands to give an gas-liquid mixture, adding sodium silicofluoride to the resulting gas-liquid mixture to give a mixture, and curing the mixture.

Figure 1:
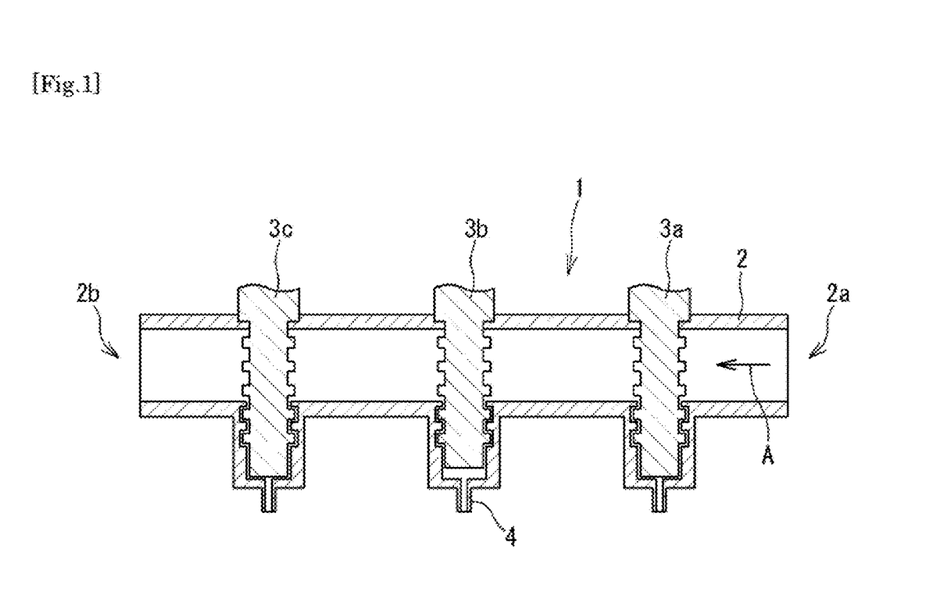
FIG. 1 is a schematic cross-sectional view illustrating one embodiment of an apparatus for producing an elastic foamed body, which is used when a rubber latex elastic foamed body of the present invention is produced.

When a rubber latex elastic foamed body of the present invention is produced, there can be used, for example, an apparatus for producing a rubber latex elastic foamed body illustrated in FIG. 1. FIG. 1 is a schematic cross-sectional view illustrating one embodiment of an apparatus for producing a rubber latex elastic foamed body.

The apparatus 1 for producing a rubber latex elastic foamed body illustrated in FIG. 1 has a producing apparatus main body 2. The size of the producing apparatus main body 2 is arbitrary. It is preferred that the producing apparatus main body 2 has an inner diameter of 150 to 400 mm or so, and a length of 400 to 1200 mm or so, from the viewpoint of efficient and uniform dispersion of fine bubbles in the gas-liquid mixture.

The producing apparatus main body 2 has a liquid mixture inlet 2a for introducing the gas-liquid mixture (not illustrated), which has been previously prepared by injecting the air into the liquid raw material containing a rubber latex and an additive as occasion demands, to the producing apparatus main body 2, and a liquid mixture outlet 2b for discharging the gas-liquid mixture from the producing apparatus main body 2.

The producing apparatus main body 2 is provided with mixing devices 3a, 3b and 3c for mixing the gas-liquid mixture which is introduced to the producing apparatus main body 2 by applying a shear force to the gas-liquid mixture. It is possible to uniformly disperse fine bubbles in the gas-liquid mixture by using the mixing devices 3a, 3b, and 3c.

As the mixing devices 3a, 3b and 3c, there can be cited, for example, a homodisper, a homomixer, a homogenizer, the Oakes mixer, a microfluidizer, a disper-mixer having a stirring bar, an impeller type mixing device having a rotating vane and the like, and the present invention is not limited only to those exemplified ones.

Each interval among the mixing devices 3a, 3b and 3c is arbitrary, and each interval is preferably 150 to 300 mm or so respectively from the viewpoint of efficient and uniform dispersion of fine bubbles in the gas-liquid mixture.

The above-mentioned gas-liquid mixture is prepared by injecting the air into the liquid raw material containing a rubber latex and an additive as occasion demands. The mixing ratio of the air to the liquid raw material is usually preferably adjusted so that the amount of the air is 300 to 1000 mL per 100 mL of the liquid raw material. The liquid raw material can be mixed with the air, for example, by using a mixing device such as a mixer or a kneader, and the present invention is not limited only to the exemplified mixing devices.

The above-mentioned gas-liquid mixture is introduced into the producing apparatus main body 2 through the liquid mixture inlet 2a. The gas-liquid mixture which is introduced into the producing apparatus main body 2 is fed in the direction of arrow A, and a shear force is applied to the gas-liquid mixture by the mixing devices 3a, 3b and 3c. Since a shear force is applied to the gas-liquid mixture as mentioned above, fine bubbles can be uniformly dispersed in the gas-liquid mixture.

The temperature of the gas-liquid mixture which is introduced into the producing apparatus main body 2 is not particularly limited, and is usually preferably 25 to 35° C. or so.

As illustrated in FIG. 1, the producing apparatus main body 2 is equipped with the mixing devices 3a, 3b and 3c. The number of the mixing devices which are disposed in the producing apparatus main body 2 is not particularly limited, and it is preferable to appropriately adjust the number of the mixing devices within a scope which would not hinder an object of the present invention. Therefore, the number of the mixing devices disposed in the producing apparatus main body 2 can be, for example, two, or four or more. However, the number of the mixing devices disposed in the producing apparatus main body 2 is preferably 2 to 4, and more preferably 3 from the viewpoint of efficient production of a gas-liquid mixture in which fine bubbles are uniformly dispersed.

The volumetric flow rate of the gas-liquid mixture which is introduced into the producing apparatus main body 2 cannot be absolutely determined, since the volumetric flow rate varies depending on the inner diameter of the producing apparatus main body 2 and the like. For example, when a producing apparatus main body 2 having an inner diameter of 150 to 400 mm or so is used, the volumetric flow rate is preferably 0.5 to 10 L/min or so. In addition, the temperature of the gas-liquid mixture which is introduced into the producing apparatus main body 2 can be room temperature, or can be increased by heating.

In the present invention, a process for adding sodium silicofluoride to the gas-liquid mixture is employed. The above-mentioned process can be carried out, for example, by disposing an inlet nozzle 4 of sodium silicofluoride to the mixing device 3b which is disposed in the producing apparatus main body 2, and introducing sodium silicofluoride (not illustrated) into the producing apparatus through the inlet nozzle 4 as illustrated in FIG. 1. It is preferable to use sodium silicofluoride, for example, in the form of an aqueous dispersion which is prepared by adding sodium silicofluoride to water, because the solubility of sodium silicofluoride in water is 0.76 g/100 mL at 25° C.

The inner diameter of the inlet nozzle 4 is not particularly limited, and it is preferred that the inner diameter is 0.5 to 5 mm or so from the viewpoint of, for example, efficient introduction of an aqueous dispersion of sodium silicofluoride into the mixing device 3b.

The amount of sodium silicofluoride which is introduced to the inlet nozzle 4 is preferably 0.5 to 10 parts by mass, and more preferably 1 to 5 parts by mass per 100 parts by mass of the gas-liquid mixture, from the viewpoint of efficient production of a gas-liquid mixture in which fine bubbles are uniformly dispersed.

The sodium silicofluoride which is introduced to the inlet nozzle 4 is introduced into the producing apparatus main body 2, and is mixed with the gas-liquid mixture. When the sodium silicofluoride is mixed with the gas-liquid mixture, the temperature of the gas-liquid mixture is usually preferably 25 to 35° C. or so, as well as mentioned above.

It is preferred that the producing apparatus main body 2 is equipped with the mixing device 3c, and a liquid mixture of the sodium silicofluoride and the gas-liquid mixture is mixed in the mixing device 3c from the viewpoint of uniform dispersion of the sodium silicofluoride in the gas-liquid mixture.

The liquid mixture thus obtained by mixing the sodium silicofluoride with the gas-liquid mixture as described above is discharged from the liquid mixture outlet 2b of the producing apparatus main body 2.

In order to prevent the bubbles contained in the liquid mixture from flowing and coupling with one another to form bubbles having a greater bubble size in the liquid mixture discharged from the liquid mixture outlet 2b of the producing apparatus main body 2, it is preferred to heat and acidify the liquid mixture to form a condensate. As a heating means for heating the liquid mixture, there can be cited, for example, a means for irradiating the liquid mixture with a microwave and the like, and the present invention is not limited only to those exemplified ones.

When a condensate is formed from the liquid mixture by irradiating the liquid mixture with a microwave, the irradiation of a microwave can be carried out, for example, after a mold is charged with the liquid mixture. In this case, the period of time from injection of the liquid mixture into a mold up to irradiation of a microwave is preferably within 70 seconds from the viewpoint of suppression of increase in size of bubbles generated by coupling of fine bubbles.

The frequency of the microwave is not particularly limited, and is usually preferably 2400 to 2500 MHz or so. The period of time for irradiating the liquid mixture with a microwave cannot be absolutely determined since the period of time varies depending on an output of the microwave and the like. The period of time is usually a period of time necessary for sufficiently solidifying the liquid mixture.

Next, the condensate obtained in the above can be vulcanized by heating the condensate. When the condensate is heated, a mold can be used. A rubber latex elastic foamed body having a predetermined shape can be obtained by filling the condensate in a mold having a predetermined inner shape, and then heating the condensate. A method for heating the condensate includes, for example, a method for heating the condensate by means of a heater, a method for heating the condensate by irradiating the condensate with a microwave and the like, and the present invention is not limited only to those exemplified ones.

The temperature for heating the condensate is preferably 80 to 150° C. or so, and more preferably 100 to 130° C. or so, from the viewpoint of efficient production of an elastic foamed body which has rich texture and which is excellent in fitting property to a skin, application property of a powder and even powder application. In addition, the period of time necessary for heating the condensate cannot be absolutely determined since the period of time varies depending on a heating temperature and the like, and the period of time is usually 15 to 60 minutes or so.

When the above process is employed, there can be produced a rubber latex elastic foamed body having an average radius of cellular foam of 10 to 200 μm, a bulk density of 0.10 to 0.20 g/cm$^3$ and a stress of 0.1 to 1 N/cm$^2$ at 50% compression.

The rubber latex elastic foamed body obtained in the above can be cut so as to have a predetermined size and a predetermined shape as occasion demands. Alternatively, the rubber latex elastic foamed body can be attached to another rubber latex elastic foamed body or a substrate, or can be polished.

As mentioned above, since the rubber latex elastic foamed body of the present invention has an average radius of cellular foam of 10 to 200 μm, a bulk density of 0.10 to 0.20 g/cm$^3$ and a stress of 0.1 to 1 N/cm$^2$ at 50% compression, the rubber latex elastic foamed body has rich texture and is excellent in fitting property to a skin, application property of a powder and even powder application.

In the present invention, the average radius of the cellular foam of the rubber latex elastic foamed body is an average of the radiuses of 10 cellular foam as determined by cutting the rubber latex elastic foamed body, randomly selecting 10 cellular foam present on the cross section thereof, and measuring the radius of the virtual true circle passing through three points on the inner peripheral edge of the cross section of each cellular foam by using a laser microscope [product number: VK-8700 produced by KEYENCE CORPORATION] to determine the average radius of each cellular foam. The average radius of the cellular foam of the rubber latex elastic foamed body is 10 μm or more, preferably 20 μm or more, and more preferably 40 μm or more, from the viewpoint of improvement in application property of a powder. The average radius is 200 μm or less, preferably 180 μm or less, more preferably 150 μm or less, furthermore preferably 120 μm or less, and even furthermore preferably 100 μm or less, from the viewpoint of improvement in texture, fitting property to a skin and even powder application.

In the present invention, the bulk density of the rubber latex elastic foamed body is an average of bulk densities as determined by preparing three rubber latex elastic foamed bodies, and dividing the volume of each rubber latex elastic foamed body by the mass of the foamed body. The bulk density of the rubber latex elastic foamed body of the present invention is 0.10 g/cm$^3$ or more, preferably 0.11 g/cm$^3$ or more, more preferably 0.12 g/cm$^3$ or more and furthermore preferably 0.125 g/cm$^3$ or more, from the viewpoint of improvement in application property of a powder. The bulk density is 0.20 g/cm$^3$ or less, preferably 0.18 g/cm$^3$ or less and more preferably at 0.16 g/cm$^3$ or less, from the viewpoint of improvement in texture, fitting property to a skin and even powder application.

In the present invention, the stress of the rubber latex elastic foamed body at 50% compression is an average of stresses as determined by preparing three flat rubber latex elastic foamed bodies, sandwiching each rubber latex elastic foamed body between two flat plates, and measuring a load per unit area when the thickness of the rubber latex elastic foamed body becomes 50% of that when the rubber latex elastic foamed body is not loaded. The stress of the rubber latex elastic foamed body of the present invention is 0.1 N/cm$^2$ or more, preferably 0.2 N/cm$^2$ or more and more preferably 0.3 N/cm$^2$ or more at 50% compression, from the viewpoint of improvement in texture, fitting property to a skin and even powder application. The stress is 1 N/cm$^2$ or less, preferably 0.9 N/cm$^2$ or less, more preferably 0.8 N/cm$^2$ or less, furthermore preferably 0.7 N/cm$^2$ or less and even furthermore preferably 0.6 N/cm$^2$ or less, from the viewpoint of improvement in application property of a powder.

In the present invention, the coefficient of dynamic friction of the rubber latex elastic foamed body is preferably 0.5 to 1.8 from the viewpoint of preparation of a rubber latex elastic foamed body which has rich texture and is excellent in fitting property to a skin, application property of a powder and even powder application. The coefficient of dynamic friction of the rubber latex elastic foamed body is an average of the coefficient of dynamic frictions as determined by preparing three rubber latex elastic foamed bodies, and applying a load to the flat plate by means of a static and dynamic friction coefficient measuring instrument [product number: TL201Ts produced by Trinity-Lab inc.] under the conditions of a speed of 10 mm/s, a load of 50 g, a travelling distance of 20 mm and an ambient temperature of 25° C., to measure a coefficient of dynamic friction of each rubber latex elastic foamed body. The coefficient of dynamic friction of the rubber latex elastic foamed body is preferably 0.5 or more, more preferably 0.7 or more, further preferably 0.8 or more, furthermore preferably 0.9 or more and even furthermore preferably 1 or more, from the viewpoint of improvement in texture, fitting property to a skin and even powder application. The coefficient of dynamic friction is preferably 1.8 or less, more preferably 1.75 or less and furthermore preferably 1.7 or less, from the viewpoint of imparting of smoothness and moist feeling to a skin.

As mentioned above, the rubber latex elastic foamed body of the present invention has rich texture and is excellent in fitting property to a skin, application property of a powder and even powder application. Therefore, the rubber latex elastic foamed body of the present invention is expected to be used in applications, for example, a makeup application tool such as a puff, a cleaning tool such as a wiper, a cushioning material, a filtration sheet, and the like.

EXAMPLES

Next, the present invention will be more specifically described with reference to working examples. However, the present invention is not limited only to those examples.

Preparation Example 1

A liquid raw material was prepared by mixing 100 parts by mass of a rubber latex [trade name: aqueous emulsion (solid content: 65%) of Nipol LX 531B produced by ZEON CORPORATION], 1.3 parts by mass of sulfur [produced by Hosoi Chemical Industry Co., Ltd.] as a vulcanizing agent, 0.6 part by mass of a vulcanization accelerating auxiliary [trade name: TRIMENE BASE produced by Uniroyal Chemical Co., Inc.], 1.3 parts by mass of a vulcanization accelerator [trade name: Accel MZ produced by Kawaguchi Chemical Industry Co., LTD.], 1.0 part by mass of an antioxidant [trade name: Antage BHT produced by Kawaguchi Chemical Industry Co., LTD.] and 0.4 parts by mass of an antimicrobial agent [trade name: Cosmo Pearl AB-5 produced by Taiki Corp., Ltd.].

Example 1

A gas-liquid mixture was obtained by injecting the air into the liquid raw material obtained in Preparation Example 1 so that the amount of the air per 100 mL of the liquid raw material became 600 mL (expansion ratio: 6 times). An apparatus 1 for producing a rubber latex elastic foamed body as illustrated in FIG. 1 was used, and the gas-liquid mixture obtained in the above was fed to the apparatus 1, to give a liquid mixture.

More specifically, an apparatus for producing a rubber latex elastic foamed body having a producing apparatus main body 2 which has an inner diameter of 150 mm and a length of 1200 mm, and in which the mixing devices 3a, 3b, and 3c are disposed at equal intervals of 300 mm was used.

The gas-liquid mixture having a temperature of about 25° C. was fed to the producing apparatus main body 2, and a shear stress was applied to the gas-liquid mixture by using the mixing devices 3a, 3b, and 3c disposed in the producing apparatus main body 2. Incidentally, the volumetric flow rate of the gas-liquid mixture which was introduced into the producing apparatus main body 2 was adjusted to 3 L/min.

Next, an aqueous dispersion of sodium silicofluoride was introduced into the producing apparatus through the inlet nozzle 4 disposed in the producing apparatus main body 2 while adjusting the amount of sodium silicofluoride per 100 parts by mass of the gas-liquid mixture to 1.5 parts by mass.

The liquid mixture thus obtained by mixing the gas-liquid mixture with sodium silicofluoride was discharged from the liquid mixture outlet 2b of the producing apparatus main body 2.

Next, the liquid mixture obtained in the above was injected into a mold for sheet molding (length: 400 mm, width: 400 mm, depth: 25 mm). The liquid mixture was solidified by irradiating with a microwave (frequency: 2450 MHz) for 15 seconds, and dried at 100° C. for 45 minutes, to form a sheet.

The formed sheet was taken out from the mold, and sliced so as to have a thickness of 8 mm, to give a sample. The sample thus obtained was punched so as to have a circular plane shape having a diameter of 60 mm, and then heated at a temperature of 110° C. for 30 minutes to vulcanize, to give a rubber latex elastic foamed body.

The rubber latex elastic foamed body obtained in the above had an average radius of cellular foam of 44.4 μm, a bulk density of 0.14 g/cm$^3$, a stress of 0.60 N/cm$^2$ at 50% compression and a coefficient of dynamic friction of 1.371.

Next, a photograph of the sliced surface (cross section) of the rubber latex elastic foamed body obtained in the above was taken by a high resolution micro-CT [trade name: TOSCANER-32300μFD produced by TOSHIBA IT & CONTROL SYSTEMS CORPORATION]. The photograph of a cross section of the rubber latex elastic foamed body according to X-ray computed tomography is shown in FIG. 2.

Figure 2:
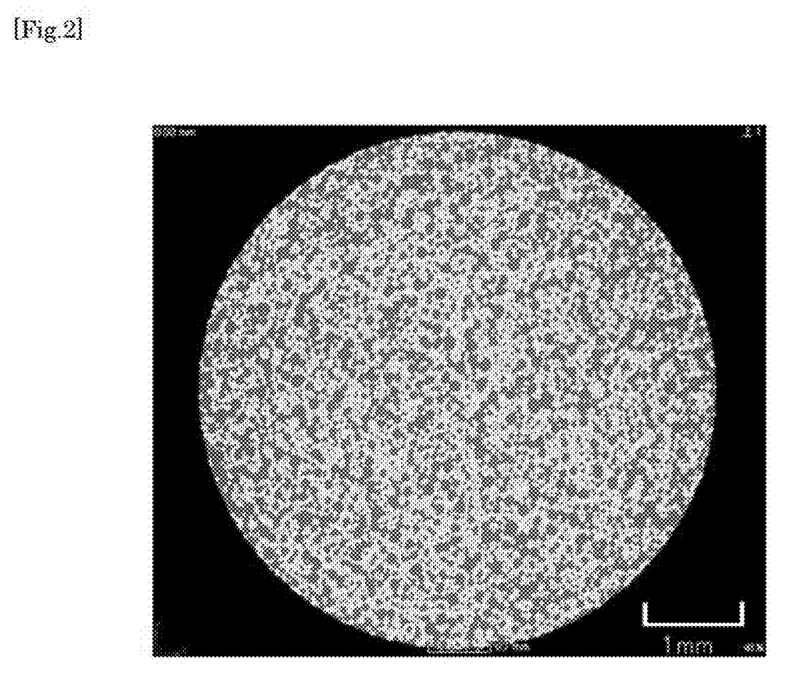
FIG. 2 is a photograph of a cross section of the rubber latex elastic foamed body obtained in Example 1, according to X-ray computed tomography.

From the results shown in FIG. 2, it can be seen that the cellular foam of the rubber latex elastic foamed body, which were black-colored have a fine structure.

Example 2

A rubber latex elastic foamed body was obtained in the same manner as in Example 1 except that the amount of the air per 100 mL of the liquid raw material was changed to 650 mL (expansion ratio: 6.5 times) in Example 1.

The rubber latex elastic foamed body obtained in the above had an average radius of cellular foam of 66.3 μm, a bulk density of 0.137 g/cm$^3$, a stress of 0.56 N/cm$^2$ at 50% compression and a coefficient of dynamic friction of 1.673.

Next, a photograph of the sliced surface (cross section) of the rubber latex elastic foamed body obtained in the above was taken by a high resolution micro-CT [trade name: TOSCANER-32300μFD produced by TOSHIBA IT & CONTROL SYSTEMS CORPORATION]. The photograph of a cross section of the rubber latex elastic foamed body according to X-ray computed tomography is shown FIG. 3.

Figure 3:
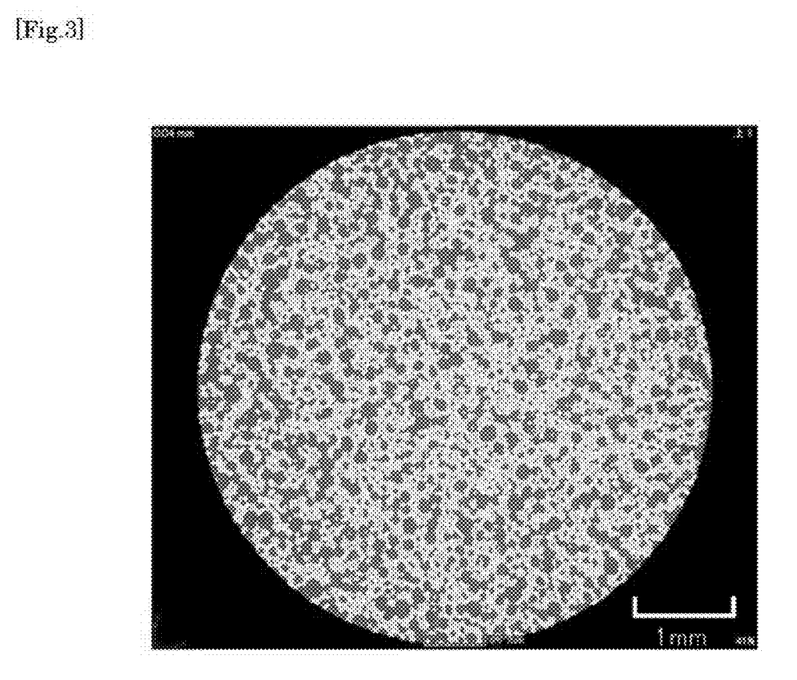
FIG. 3 is a photograph of a cross section of the rubber latex elastic foamed body obtained in Example 2, according to X-ray computed tomography.

From the results shown in FIG. 3, it can be seen that the cellular foam of the rubber latex elastic foamed body, which were black-colored have a fine structure, as well as the rubber latex elastic foamed body obtained in Example 1.

Example 3

A rubber latex elastic foamed body was obtained in the same manner as in Example 1 except that the amount of the air per 100 mL of the liquid raw material was changed to 700 mL (expansion ratio: 7 times) in Example 1.

The rubber latex elastic foamed body obtained in the above had an average radius of cellular foam of 132.8 μm, a bulk density of 0.134 g/cm$^3$, a stress of 0.78 N/cm$^2$ at 50% compression and a coefficient of dynamic friction of 1.800.

Next, a photograph of the sliced surface (cross section) of the rubber latex elastic foamed body obtained in the above was taken by a high resolution micro-CT [trade name: TOSCANER-32300μFD produced by TOSHIBA IT & CONTROL SYSTEMS CORPORATION]. The photograph of a cross section of the rubber latex elastic foamed body according to X-ray computed tomography is shown FIG. 4.

Figure 4:
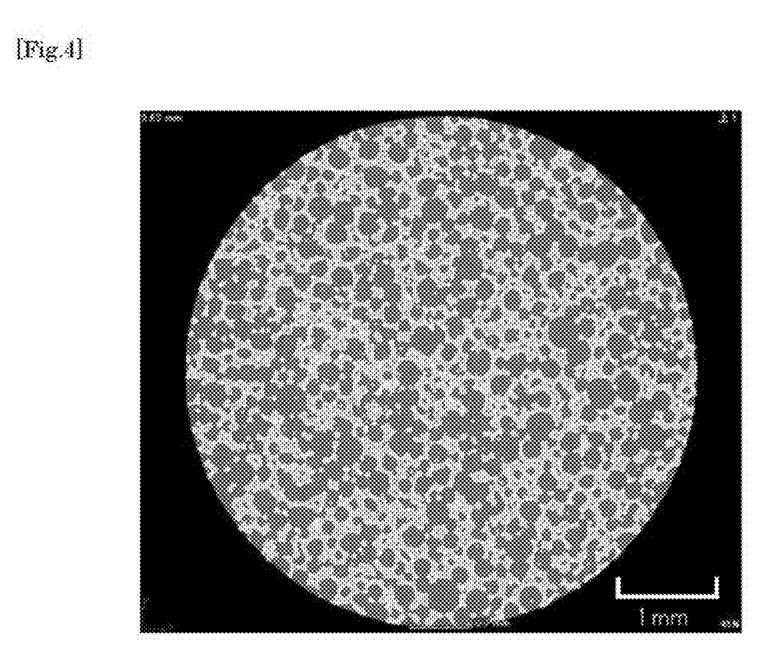
FIG. 4 is a photograph of a cross section of the rubber latex elastic foamed body obtained in Example 3, according to X-ray computed tomography.

From the results shown in FIG. 4, it can be seen that the cellular foam of the rubber latex elastic foamed body, which were black-colored have a fine structure slightly greater than the rubber latex elastic foamed body obtained in Example 1.

Reference Example

A liquid mixture obtained by adding sodium silicofluoride to the liquid raw material obtained in Preparation Example 1 so that the amount of sodium silicofluoride per 100 parts by mass of the liquid raw material became 1.5 parts by mass. The air was injected into the liquid raw material so that the amount of the air per 100 mL of the liquid raw material became 600 mL (expansion ratio: 6 times), and the resulting liquid mixture was stirred by means of the Oakes mixer. Thereafter, in the same manner as in Example 1, the liquid mixture was injected into a mold for sheet molding (length: 400 mm, width: 400 mm, depth: 25 mm). The liquid mixture was irradiated with a microwave (frequency: 2450 MHz) for 15 seconds to solidify, and dried at 100° C. for 45 minutes, to form a sheet.

The formed sheet was taken out from the mold, and sliced so as to have a thickness of 8 mm, to give a sample. The sample thus obtained was punched so as to have a circular plane shape having a diameter of 60 mm, and then heated at a temperature of 110° C. for 30 minutes to vulcanize, to give a rubber latex elastic foamed body.

The rubber latex elastic foamed body obtained in the above had an average radius of cellular foam of 179.1 μm, a bulk density of 0.130 g/cm$^3$, a stress of 1.00 N/cm$^2$ at 50% compression and a coefficient of dynamic friction of 1.845.

Next, a photograph of the sliced surface (cross section) of the rubber latex elastic foamed body obtained in the above was taken by a high resolution micro-CT [trade name: TOSCANER-32300μFD produced by TOSHIBA IT & CONTROL SYSTEMS CORPORATION]. The photograph of a cross section of the rubber latex elastic foamed body according to X-ray computed tomography is shown in FIG. 5.

Figure 5:
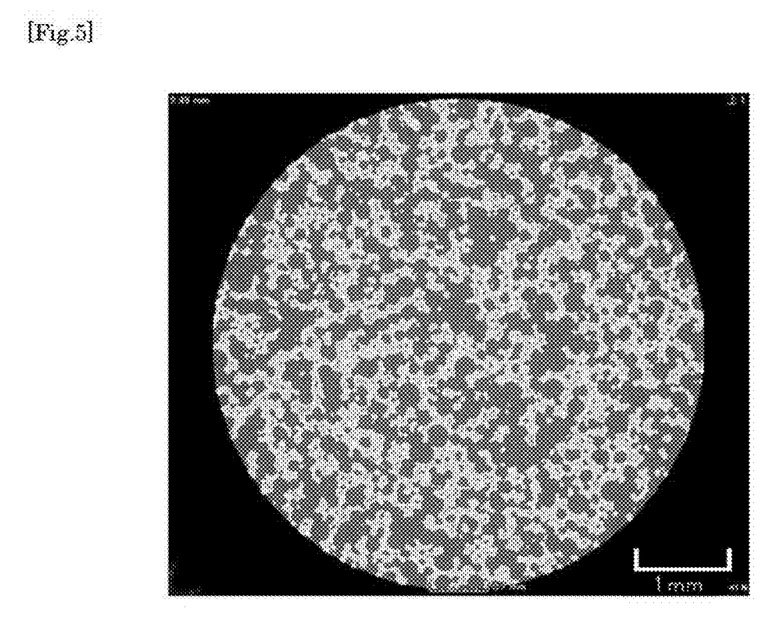
FIG. 5 is a photograph of a cross section of the rubber latex elastic foamed body obtained in Reference Example, according to X-ray computed tomography.

From the results shown in FIG. 5, it can be seen that the cellular foam of the rubber latex elastic foamed body, which were black-colored have grown up, and each of the cellular foam has a diameter considerably greater than that in Example 1.

Next, the outer peripheral edge of the rubber latex elastic foamed bodies obtained in each Example or Reference Example was polished, to give a puff. As the physical properties of the puff obtained in the above, texture, fitting property to a skin, application property of a powder and even powder application were examined in accordance with the following methods. The results are shown in Table 1.

(1) Texture

Ten professional panelists touched the puff obtained in each Examples or Reference Example with their fingers, and evaluated texture in accordance with the following evaluation criteria.

[Evaluation Criteria]

⊚: Among 10 panelists, 9 or 10 panelists evaluated that the puff obtained in Example was superior in texture to the puff obtained in Reference Example.

○: Among 10 panelists, 7 or 8 panelists evaluated that the puff obtained in Example was superior in texture to the puff obtained in Reference Example.

Δ: Among 10 panelists, 5 or 6 panelists evaluated that the puff obtained in Example was superior in texture to the puff obtained in Reference Example.

x: Among 10 panelists, 4 or fewer panelists evaluated that the puff obtained in Example was superior in texture to the puff obtained in Reference Example.

(2) Fitting Property to Skin

Ten professional panelists rubbed the puff obtained in each Examples or Reference Example on the back of a hand, to examine fitting property to a skin, and evaluated fitting property to a skin in accordance with the following evaluation criteria.

[Evaluation Criteria]

⊚: Among 10 panelists, 9 or 10 panelists evaluated that the puff obtained in Example was superior in fitting property to skin to the puff obtained in Reference Example.

○: Among 10 panelists, 7 or 8 panelists evaluated that the puff obtained in Example was superior in fitting property to skin to the puff obtained in Reference Example.

Δ: Among 10 panelists, 5 or 6 panelists evaluated that the puff obtained in Example was superior in fitting property to skin to the puff obtained in Reference Example.

x: Among 10 panelists, 4 or fewer panelists evaluated that the puff obtained in Example was superior in fitting property to skin to the puff obtained in Reference Example.

(3) Application Property of Powder

As a powder, a powder foundation was used. Ten professional panelists put and rubbed lightly the powder foundation on the puff obtained in each Example or Reference Example to deposit the powder foundation on the puff, and at that time, evaluated property of powder in accordance with the following evaluation criteria.

[Evaluation Criteria]

⊚: Among 10 panelists, 9 or 10 panelists evaluated that the puff obtained in Example was superior in deposition of powder foundation to the puff obtained in Reference Example.

○: Among 10 panelists, 7 or 8 panelists evaluated that the puff obtained in Example was superior in deposition of powder foundation to the puff obtained in Reference Example.

Δ: Among 10 panelists, 5 or 6 panelists evaluated that the puff obtained in Example was superior in deposition of powder foundation to the puff obtained in Reference Example.

x: Among 10 panelists, 4 or fewer panelists evaluated that the puff obtained in Example was superior in deposition of powder foundation to the puff obtained in Reference Example.

(4) Even Powder Application

As a powder, a powder foundation was used. Ten professional panelists put and rubbed lightly the powder foundation on the puff obtained in each Examples or Reference Example, to deposit the powder foundation on the puff. At that time, the panelists observed the existence of unevenness of the powder foundation, and evaluated even powder application in accordance with the following evaluation criteria.

[Evaluation Criteria]

⊚: Among 10 panelists, 9 or 10 panelists evaluated that the puff obtained in Example has unevenness less than the puff obtained in Reference Example.

○: Among 10 panelists, 7 or 8 panelists evaluated that the puff obtained in Example has unevenness less than the puff obtained in Reference Example.

Δ: Among 10 panelists, 5 or 6 panelists evaluated that the puff obtained in Example has unevenness less than the puff obtained in Reference Example.

x: Among 10 panelists, 4 or fewer panelists evaluated that the puff obtained in Example has unevenness less than the puff obtained in Reference Example.

(5) Smoothness

Ten professional panelists rubbed the puff obtained in each Examples or Reference Example on the back of a hand, and evaluated smoothness of the puff in accordance with the following evaluation criteria.

[Evaluation Criteria]

⊚: Among 10 panelists, 9 or 10 panelists evaluated that the puff obtained in Example was superior in smoothness of a puff to the puff obtained in Reference Example.

○: Among 10 panelists, 7 or 8 panelists evaluated that the puff obtained in Example was superior in smoothness of a puff to the puff obtained in Reference Example.

Δ: Among 10 panelists, 5 or 6 panelists evaluated that the puff obtained in Example was superior in smoothness of a puff to the puff obtained in Reference Example.

x: Among 10 panelists, 4 or fewer panelists evaluated that the puff obtained in Example was superior in smoothness of a puff to the puff obtained in Reference Example.

(6) Moist Feeling

Ten professional panelists rubbed the puff obtained in each Examples or Reference Example on the back of a hand, and evaluated moist feeling of the puff in accordance with the following evaluation criteria.

[Evaluation Criteria]

⊚: Among 10 panelists, 9 or 10 panelists evaluated that the puff obtained in Example was superior in moist feeling of a puff to the puff obtained in Reference Example.

○: Among 10 panelists, 7 or 8 panelists evaluated that the puff obtained in Example was superior in moist feeling of a puff to the puff obtained in Reference Example.

Δ: Among 10 panelists, 5 or 6 panelists evaluated that the puff obtained in Example was superior in moist feeling of a puff to the puff obtained in Reference Example.

x: Among 10 panelists, 4 or fewer panelists evaluated that the puff obtained in Example was superior in moist feeling of a puff to the puff obtained in Reference Example.

TABLE 1

| Example or Comparative Example Number | Physical properties of rubber latex elastic foamed body | | | | | |
|---|---|---|---|---|---|---|
| | Texture | Fitting property to skin | Application property of powder | Even powder application | Smoothness | Moist feeling |
| Example 1 | ⊚ | ⊚ | ⊚ | ⊚ | ⊚ | ⊚ |
| Example 2 | ⊚ | ○ | ⊚ | ⊚ | ⊚ | ○ |
| Example 3 | ⊚ | Δ | ○ | ○ | ○ | Δ |

From the results shown in Table 1, it can be seen that all of the rubber latex elastic foamed bodies obtained in the Examples are more excellent in texture, fitting property to a skin, application property of a powder and even powder application than the conventional rubber latex elastic foamed body obtained in Reference Example. Among the Examples, it can be seen that the rubber latex elastic foamed body obtained in Examples 1 and 2, particularly in Example 1 is more excellent in smoothness and moist feeling, since the rubber latex elastic foamed body has a specific coefficient of dynamic friction.

INDUSTRIAL APPLICABILITY

The rubber latex elastic foamed body of the present invention is excellent in texture, fitting property to a skin, application property of a powder and even powder application overall. Therefore, the rubber latex elastic foamed body is expected to be used in applications, for example, a makeup application tool such as a puff, a cleaning tool such as a wiper, a cushion material, a filtration sheet, and the like.

EXPLANATIONS OF REFERENTIAL NUMBERS

1 Producing apparatus
2 Producing apparatus main body
2a Liquid mixture inlet
2b Liquid mixture outlet
3a Mixing device
3b Mixing device
3c Mixing device
4 Inlet nozzle

The invention claimed is:

1. A rubber latex elastic foamed body, in which a rubber latex and sodium silicofluoride are used as raw materials, wherein the rubber latex elastic foamed body has an average radius of cellular foam of 10 to 100 μm, a bulk density of 0.10 to 0.20 g/cm$^3$ and a stress of 0.1 to 1 N/cm$^2$ at 50% compression.

2. The rubber latex elastic foamed body according to claim 1, wherein the rubber latex elastic foamed body has a coefficient of dynamic friction of 0.5 to 1.8.

3. The rubber latex elastic foamed body according to claim 1, wherein the average radius of cellular foam is 20 to 100 μm.

4. The rubber latex elastic foamed body according to claim 1, wherein the average radius of cellular foam is 40 to 100 μm.

5. The rubber latex elastic foamed body according to claim 1, wherein the bulk density is 0.12 to 0.18 g/cm$^3$.

6. The rubber latex elastic foamed body according to claim 1, wherein the bulk density is 0.125 to 0.16 g/cm$^3$.

7. The rubber latex elastic foamed body according to claim 1, wherein the stress is 0.2 to 0.7 N/cm$^2$.

8. The rubber latex elastic foamed body according to claim 1, wherein the stress is 0.3 to 0.6 N/cm$^2$.

9. The rubber latex elastic foamed body according to claim 2, wherein the coefficient of dynamic friction is 0.8 to 1.75.

10. The rubber latex elastic foamed body according to claim 2, wherein the coefficient of dynamic friction is 0.9 to 1.7.

* * * * *